United States Patent
Kang

(10) Patent No.: US 7,214,284 B2
(45) Date of Patent: May 8, 2007

(54) MANUFACTURING METHOD OF TRADEMARK LABEL

(76) Inventor: Bang Suk Kang, 101-2501 Sungdo APT, 10 Gaeguem 3-dong, Busanjin-gu, Busan 614-809 (KR)

( * ) Notice: Subject to any disclaimer, the term of this patent is extended or adjusted under 35 U.S.C. 154(b) by 303 days.

(21) Appl. No.: 10/500,730

(22) PCT Filed: Jan. 21, 2003

(86) PCT No.: PCT/KR03/00126

§ 371 (c)(1),
(2), (4) Date: Jan. 7, 2005

(87) PCT Pub. No.: WO03/061950

PCT Pub. Date: Jul. 31, 2003

(65) Prior Publication Data

US 2006/0231584 A1    Oct. 19, 2006

(30) Foreign Application Priority Data

Jan. 21, 2002  (KR) ...................... 10-2002-0003403

(51) Int. Cl.
 *B29C 65/00*  (2006.01)
(52) U.S. Cl. ................ 156/80; 156/63; 156/299; 156/314; 156/256
(58) Field of Classification Search ........ 156/299, 156/314, 80, 256, 63; 36/136, 132; 427/389; 264/259, 263
See application file for complete search history.

(56) References Cited

U.S. PATENT DOCUMENTS 2,282,169 A * 5/1942 Cunnington ............. 156/219
5,393,372 A * 2/1995 Ammon ................... 216/33
5,824,397 A   10/1998 Koops et al.

FOREIGN PATENT DOCUMENTS

| JP | 56-123543 A | 9/1981 |
|---|---|---|
| JP | 2000-26821 A | 1/2000 |
| KR | 91-7986 B | 10/1991 |
| KR | 98-75756 A | 11/1998 |

* cited by examiner

*Primary Examiner*—Jeff H. Aftergut
*Assistant Examiner*—Daniel McNally
(74) *Attorney, Agent, or Firm*—Birch, Stewart, Kolasch & Birch, LLP

(57) ABSTRACT

A manufacturing method of trademark label of the present invention comprises a process of making rubber sheet which produced by compounding the ingredients of natural rubber composite, a process of cutting the rubber sheet according to the design of trademark label, a process of spreading primer on adhesion side of cut trademark label and drying at normal temperature for about 5 minutes, a process of spreading binder on the primer-spread and dried part of trademark label, a process of inserting the glue-spread trademark label into the cavity of metallic mold and gluing (first gluing process) the trademark label on artificial leather, a process of removing unnecessary impurities of trademark label attached to artificial leather (by first gluing process), a process of inserting trademark label whose impurities are removed into the metallic mold and hot-pressing at the temperature of about 150°, and a process of refrigerating the trademark label hot-pressed on artificial leather to the temperature of about 5° C.

2 Claims, 2 Drawing Sheets

MANUFACTURING METHOD OF TRADEMARK LABEL

The present invention claims the benefit of Korean Patent Application No. 10-2002-0003403, filed in Korea on Jan. 21, 2002, which is hereby incorporated by reference.

BACKGROUND OF THE INVENTION

1. Field of the Invention

The present invention relates to a manufacturing method of trademark label, and more particularly to a manufacturing method of a trademark label which can be produced by natural rubber and artificial leather for shoes, bag and clothes.

2. Discussion of the Related Art

Generally, trademark labels adhered on the shoes or bags are produced by using TPR, one of the synthetic resin. However it produces noxious materials such as dioxin during incineration, so its use reduces by reason of environmental pollution. And yet proper materials and manufacturing methods that can be substituted are not developed.

SUMMARY OF THE INVENTION

Accordingly, the present invention is directed to a manufacturing method of a trademark label that substantially obviates one or more of problems due to limitations and disadvantages of the related art.

The purpose of this invention is to provide manufacturing method of a trademark label which brings a solution to the technical problem about environmental pollution and improves quality of the trademark label as well as lightens the product.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a manufacturing method of trademark label of the present invention comprises a process of making rubber sheet which is produced by compounding the ingredients of natural rubber composite, a process of cutting the rubber sheet according to the design of trademark label, a process of spreading primer on adhesion side of cut trademark label and drying at normal temperature for about 5 minutes, a process of spreading binder on the primer-spread and dried part of trademark label, a process of inserting the glue-spread trademark label into the cavity of metallic mold and gluing (first gluing process) the trademark label on artificial leather, a process of removing unnecessary impurities of trademark label attached to artificial leather (by first gluing process), a process of inserting trademark label whose impurities are removed into the metallic mold and hot-pressing at the temperature of about 150° C., and a process of refrigerating the trademark label hot-pressed on artificial leather to the temperature of about 5° C.

The natural rubber composite is composed of Natural Rubber about 6,000 g, Styrene Butadiene Rubber 5,000 g, Nitrile Butadiene Rubber 4,000 g, Zinc Oxide 1,000 g, White Carbon 6,000 g, Isopropanolamine 480 g, Butyl-p-Cresol 100 g, Stearic acid 150 g, Resin guaiac 500 g, CaO 2,000 g, Mercaptobenzothiazole 70 g, Dibenzothiazyl Disulphide 200 g, Tetramethylthiuram Monosulphide 10 g, process oil P-1 3,000 g, Sulphur 300 g in the above weight ratio and is made by roll-mixing them in a roll mixer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiment of the present invention, which is illustrated in the accompanying drawings.

Figure 1:
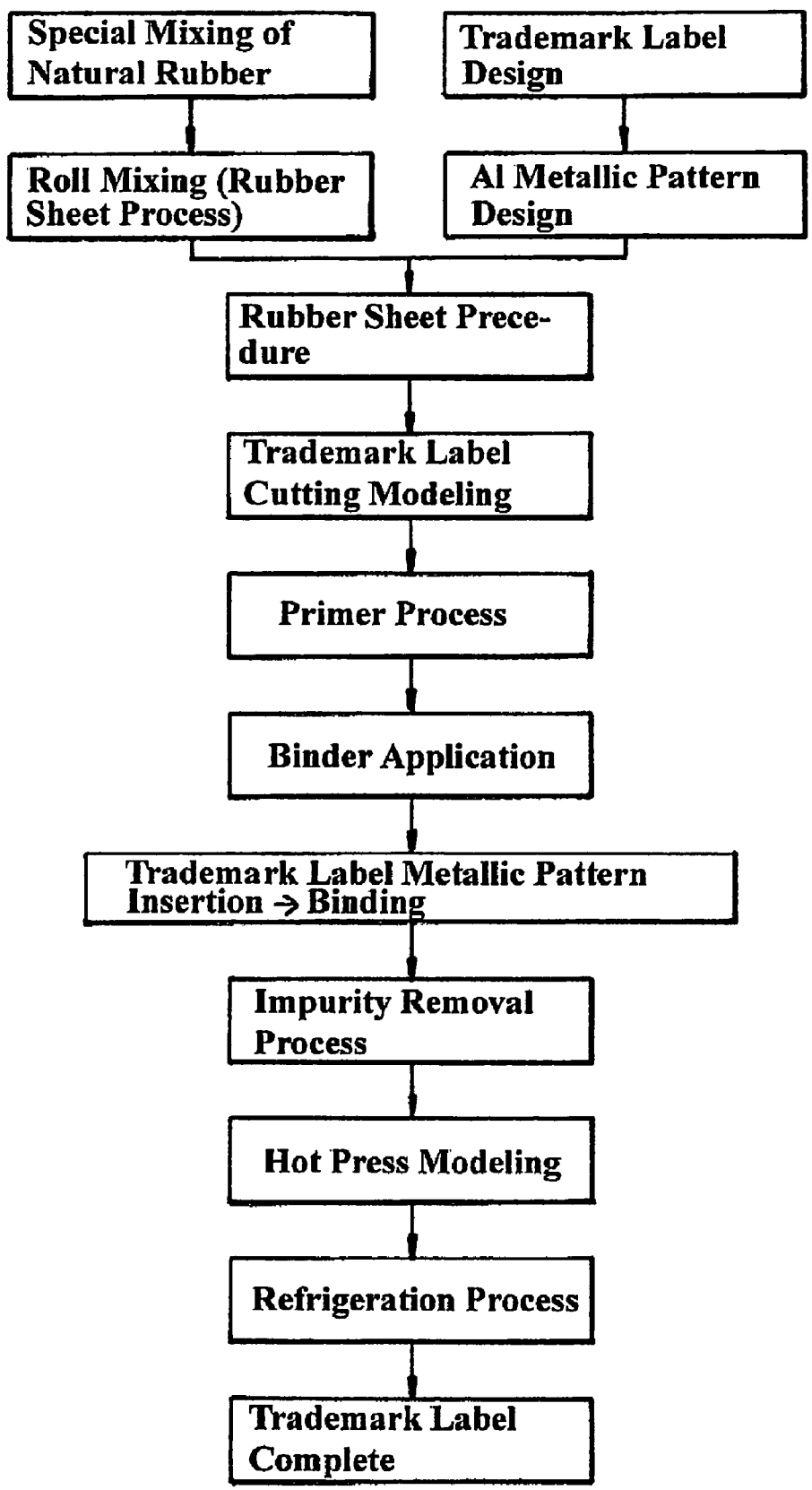
FIG. 1 is a process chart showing manufacturing method of trademark label of the present invention.
Figure 2:
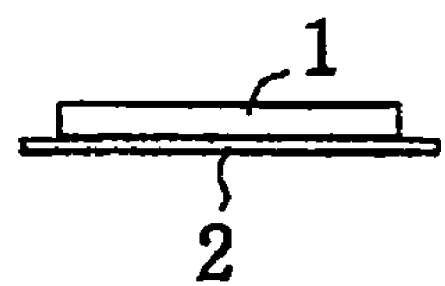
FIG. 2 is a cross-sectional view illustrating the structure of the trademark label manufactured by the method of the present invention.

FIG. 1 is a process chart showing manufacturing method of trademark label of the present invention. As shown in the figure, a trademark label (1) is manufactured by using artificial leather (2) and rubber sheet made of natural rubber composite.

An aluminum metallic mold is produced according to the trademark label (1) designed with specific logograms and figures. And then raw materials of a trademark label (1) whose chief ingredient is natural rubber are compounded.

Namely, the ingredients of the rubber sheet made of natural rubber composite is;

Natural rubber about 6,000 g,
Styrene Butadiene Rubber; SBR 5,000 g,
Nitrile Butadiene Rubber; NBR 4,000 g,
Zinc Oxide 1,000 g,
White Carbon, the color strengthener of natural rubber 6,000 g,
Isopropanolamine, the plasticizer 480 g,
Butyl-p-Cresol (BHT), the age resister 100 g,
Stearic acid, the stabilizer and plasticizer 150 g,
Guaiac resin, the antioxidant 500 g,
CaO 2,000 g,
Mercaptobenzothiazole, vulcanization accelerator 70 g,
Dibenzothiazyl Disulphide 200 g,
Tetramethylthiuram Monosulphide (TS) 10 g,
Paraffinic process oil P-1 for antipollution and color stability 3,000 g,
Sulphur, vulcanizing agent 300 g.

After all these materials are roll-mixed at the above rate in a roll mixer and vulcanized, the rubber sheet is produced.

After pressing procedure on the said rubber sheet by air-press, etc., trademark label is formed by cutting procedure according to the logo design.

As a preceding treatment procedure for gluing the trademark label (1) to the artificial leather, 'No 503 Primer' manufactured by 'Keojin Commercial Company' in Korea is spread on the back of the trademark label (1) and it is dried for 5 minutes at normal temperature. And then CRF hardener is mixed in 'DS 5109 Binder' manufactured by 'Dongsung Industrial Company' in Korea in the weight ratio of 0.5 percent, and it is spread on the back of the trademark label (1). After that, the trademark label (1) is inserted in the cavity of an aluminum metallic mold which is of the same size with the trademark label (1), and the adhesion side of the trademark label (1) is covered with the artificial leather (2), and they are glued firmly by closing the metallic mold.

After gluing procedure of rubber sheet (that is, a trademark label) made of natural rubber composite and artificial leather (2), the metallic mold is opened to remove all impurities except the trademark label (1) and it is re-inserted into metallic mold to be hot-pressed at the temperature of about 150° C. on both side alternately. And after refrigerating press procedure to the temperature of about 5° C., the completed trademark label (1) is took out from metallic mold.

The advantages of the present invention are as follows.

The trademark label (1) that is made of rubber sheet produced by natural rubber composite is firmly attached on the surface of artificial leather (2) without separation and any transformation such as a twist of product doesn't occur.

And the trademark label (1) with softness of artificial leather (2) and quality of natural rubber is visually luxurious and it provides great distinction when compared to the ordinary trademark label (1) made of synthetic rubber only.

And the natural rubber is attached on the artificial rubber (2), so it can reduce the weight of the shoes when it is used on the outsole of the shoes. Therefore it can take effect of reducing record when it is applied to the outsole of sports shoes such as marathon shoes.

And it can reduce environmental pollution because it doesn't produce noxious materials such as dioxin during incineration.

It will be apparent to those skilled in the art that various modifications and variations can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. In manufacturing method of trademark label being attached various kinds of shoes and bags,
   a manufacturing method of trademark label, comprising:
   a process of making rubber sheet by compounding the ingredients of natural rubber composite,
   a process of cutting the rubber sheet according to the specific trademark label design,
   a process of spreading primer, preceding treatment agent, on adhesion side of cut trademark label and drying at normal temperature for about 5 minutes,
   a process of spreading binder on the primer-spread and dried part of the trademark label,
   a process of inserting the glue-spread trademark label into the cavity of metallic mold and gluing (first gluing process) the trademark label on artificial leather,
   a process of removing unnecessary impurities of trademark label attached to artificial leather (by first gluing process),
   a process of inserting trademark label whose impurities are removed into the metallic mold and hot-pressing at the temperature of about 150°,
   and a process of refrigerating the trademark label hot-pressed on artificial leather to the temperature of about 5° C.

2. The manufacturing method of trademark label according to claim 1, wherein the natural rubber composite is composed of Natural Rubber about 6,000 g, Styrene Butadiene Rubber 5,000 g, Nitrile Butadiene Rubber 4,000 g, Zinc Oxide 1,000 g, White Carbon 6,000 g, Isopropanolamine 480 g, Butyl-p-Cresol 100 g, Stearic acid 150 g, Resin guaiac 500 g, CaO 2,000 g, Mercaptobenzothiazole 70 g, Dibenzothiazyl Disulphide 200 g, Tetramethylthiuram Monosulphide 10 g, process oil P-1 3,000 g, Sulphur 300 g in the above weight ratio and is made by roll-mixing them in a roll mixer.

* * * * *